(12) United States Patent
Harata et al.

(10) Patent No.: US 11,934,823 B2
(45) Date of Patent: Mar. 19, 2024

(54) ELECTRONIC CONTROL SYSTEM FOR VEHICLE, PROGRAM UPDATE APPROVAL DETERMINATION METHOD AND PROGRAM UPDATE APPROVAL DETERMINATION PROGRAM

(71) Applicant: DENSO CORPORATION, Kariya (JP)

(72) Inventors: Yuzo Harata, Kariya (JP); Kazuhiro Uehara, Kariya (JP); Takuya Kawasaki, Kariya (JP); Mitsuyoshi Natsume, Kariya (JP); Masaaki Abe, Kariya (JP)

(73) Assignee: DENSO CORPORATION, Kariya (JP)

( * ) Notice: Subject to any disclaimer, the term of this patent is extended or adjusted under 35 U.S.C. 154(b) by 8 days.

(21) Appl. No.: 17/731,569

(22) Filed: Apr. 28, 2022

(65) Prior Publication Data

US 2022/0253301 A1    Aug. 11, 2022

Related U.S. Application Data

(63) Continuation of application No. 17/153,341, filed on Jan. 20, 2021, now Pat. No. 11,709,666, which is a
(Continued)

(30) Foreign Application Priority Data

Jul. 25, 2018   (JP) ................................ 2018-139390
Jul. 12, 2019   (JP) ................................ 2019-129974

(51) Int. Cl.
*G06F 8/65*       (2018.01)
*G06F 21/57*      (2013.01)
*B60W 50/00*      (2006.01)

(52) U.S. Cl.
CPC .............. *G06F 8/65* (2013.01); *G06F 21/572* (2013.01); *B60W 50/00* (2013.01);
(Continued)

(58) Field of Classification Search
CPC .... G06F 8/65; G06F 21/572; G06F 2221/033; B60W 50/00; B60W 2050/0075; B60W 2050/0083; B60W 2556/45; B60R 16/02
See application file for complete search history.

(56) References Cited

U.S. PATENT DOCUMENTS 10,592,231 B2    3/2020  Sakurai et al.
10,678,454 B2    6/2020  Sakurai et al.
(Continued)

FOREIGN PATENT DOCUMENTS

CN    103514010 A  *  1/2014 ............. G06F 15/16
JP    2012-248018 A     12/2012
(Continued)

*Primary Examiner* — Daxin Wu
(74) *Attorney, Agent, or Firm* — Harness, Dickey & Pierce, P.L.C.

(57) ABSTRACT

An electronic control system for vehicle includes a center device that manages a program update of a vehicle, and a vehicular master device that is communicable with the center device. The center device, responsive to a user giving approval for program update by using a device not being a possession owned by the user, receives approval information of the user, and stores and manages the approval information in association with vehicle information of the user. The center device transmits the approval information to the user's vehicle side. When the vehicular master device receives the approval information, the vehicular master device performs rewriting of the program.

23 Claims, 14 Drawing Sheets

Related U.S. Application Data continuation of application No. PCT/JP2019/028653, filed on Jul. 22, 2019.

(52) U.S. Cl.
CPC ............... *B60W 2050/0075* (2013.01); *B60W 2050/0083* (2013.01); *B60W 2556/45* (2020.02); *G06F 2221/033* (2013.01)

(56) References Cited

U.S. PATENT DOCUMENTS

| | | |
|---|---|---|
| 2012/0110296 A1 | 5/2012 | Harata |
| 2012/0239246 A1 | 9/2012 | Tanaka et al. |
| 2012/0320927 A1 | 12/2012 | Katou et al. |
| 2012/0323402 A1 | 12/2012 | Murakami |
| 2013/0031212 A1 | 1/2013 | Enosaki et al. |
| 2013/0081106 A1 | 3/2013 | Harata et al. |
| 2013/0173112 A1 | 7/2013 | Takahashi et al. |
| 2013/0219170 A1 | 8/2013 | Naitou et al. |
| 2014/0277925 A1 | 9/2014 | Tanaka et al. |
| 2014/0317729 A1 | 10/2014 | Naitou et al. |
| 2015/0057840 A1 | 2/2015 | Katou et al. |
| 2015/0254909 A1 | 9/2015 | Harata et al. |
| 2015/0281022 A1 | 10/2015 | Harata et al. |
| 2015/0301822 A1 | 10/2015 | Takahashi et al. |
| 2016/0013934 A1 | 1/2016 | Smereka et al. |
| 2016/0266886 A1 | 9/2016 | Sarkar et al. |
| 2016/0318522 A1 | 11/2016 | Tanaka et al. |
| 2017/0090907 A1* | 3/2017 | Kurosawa ............... G06F 11/00 |
| 2017/0262277 A1* | 9/2017 | Endo ...................... H04L 67/04 |
| 2017/0315797 A1 | 11/2017 | Vangelov |
| 2018/0018160 A1 | 1/2018 | Teraoka et al. |
| 2018/0039936 A1 | 2/2018 | Klechner et al. |
| 2018/0074811 A1 | 3/2018 | Kiyama et al. |
| 2018/0203685 A1 | 7/2018 | Nakamura et al. |
| 2018/0376309 A1 | 12/2018 | Kondo et al. |
| 2019/0094038 A1* | 3/2019 | Oh ..................... G01C 21/3608 |
| 2019/0108014 A1 | 4/2019 | Nakamura et al. |
| 2019/0111907 A1 | 4/2019 | Harata et al. |
| 2019/0266017 A1 | 8/2019 | Nakamura et al. |
| 2019/0287626 A1 | 9/2019 | Kawasaki et al. |
| 2020/0183676 A1 | 6/2020 | Sakurai et al. |
| 2020/0216083 A1 | 7/2020 | Kawasaki et al. |
| 2020/0241771 A1 | 7/2020 | Sakurai et al. |
| 2021/0141631 A1 | 5/2021 | Harata et al. |
| 2021/0155173 A1 | 5/2021 | Harata et al. |
| 2021/0155174 A1 | 5/2021 | Harata et al. |
| 2021/0155176 A1 | 5/2021 | Harata et al. |
| 2021/0155177 A1 | 5/2021 | Harata et al. |
| 2021/0155252 A1 | 5/2021 | Harata et al. |
| 2021/0157492 A1 | 5/2021 | Harata et al. |
| 2021/0157529 A1 | 5/2021 | Sakurai et al. |
| 2021/0157566 A1 | 5/2021 | Sakurai et al. |
| 2021/0157567 A1 | 5/2021 | Sakurai et al. |
| 2021/0157568 A1 | 5/2021 | Sakurai et al. |
| 2021/0157569 A1 | 5/2021 | Harata et al. |
| 2021/0157570 A1 | 5/2021 | Harata et al. |
| 2021/0157571 A1 | 5/2021 | Ogawa et al. |
| 2021/0157572 A1 | 5/2021 | Harata et al. |
| 2021/0157573 A1 | 5/2021 | Abe et al. |
| 2021/0157574 A1 | 5/2021 | Harata et al. |
| 2021/0157575 A1 | 5/2021 | Ogawa et al. |
| 2021/0157902 A1 | 5/2021 | Sakurai et al. |
| 2021/0160064 A1 | 5/2021 | Harata et al. |
| 2021/0165585 A1 | 6/2021 | Harata et al. |
| 2021/0165644 A1 | 6/2021 | Harata et al. |
| 2021/0165649 A1 | 6/2021 | Harata et al. |
| 2021/0165651 A1 | 6/2021 | Harata et al. |
| 2021/0167988 A1 | 6/2021 | Harata et al. |
| 2021/0182048 A1 | 6/2021 | Harata et al. |
| 2021/0182049 A1 | 6/2021 | Harata et al. |
| 2021/0191661 A1 | 6/2021 | Harata et al. |
| 2021/0255805 A1 | 8/2021 | Harata et al. |
| 2022/0012043 A1 | 1/2022 | Sakurai et al. |

FOREIGN PATENT DOCUMENTS

| | | | | |
|---|---|---|---|---|
| JP | 5152297 B2 | 2/2013 | | |
| JP | 5375905 B2 | 12/2013 | | |
| JP | 5423736 B2 | 2/2014 | | |
| JP | 5423754 B2 | 2/2014 | | |
| JP | 5435022 B2 | 3/2014 | | |
| JP | 5454517 B2 | 3/2014 | | |
| JP | 2014088150 A | 5/2014 | | |
| JP | 5556824 B2 | 7/2014 | | |
| JP | 5601239 B2 | 10/2014 | | |
| JP | 2014201085 A | 10/2014 | | |
| JP | 5709055 B2 | 4/2015 | | |
| JP | 5783103 B2 | 9/2015 | | |
| JP | 5838898 B2 | 1/2016 | | |
| JP | 2016015020 A | 1/2016 | | |
| JP | 2016032274 A | 3/2016 | | |
| JP | 5900007 B2 | 4/2016 | | |
| JP | 5949416 B2 | 7/2016 | | |
| JP | 5949417 B2 | 7/2016 | | |
| JP | 6056424 B2 | 1/2017 | | |
| JP | 2017028523 A | 2/2017 | | |
| JP | 2017-0114156 A | 6/2017 | | |
| JP | 2017167646 A | 9/2017 | | |
| JP | 6216730 B2 | 10/2017 | | |
| JP | 2017220091 A | 12/2017 | | |
| JP | 2017220092 A | 12/2017 | | |
| JP | 2018013837 A | 1/2018 | | |
| JP | 2018045515 A | * | 3/2018 | .......... G06F 11/1433 |
| JP | 2018065410 A | 4/2018 | | |
| JP | 2018092577 A | 6/2018 | | |
| JP | 2018092630 A | 6/2018 | | |
| JP | 2018097571 A | 6/2018 | | |
| JP | 2018129732 A | 8/2018 | | |
| JP | 2019066181 A | 4/2019 | | |
| KR | 20180096087 A | * | 2/2017 | ............ G06Q 50/10 |
| KR | 20180096087 A | 8/2018 | | |
| WO | WO-2017098817 A1 | 6/2017 | | |

* cited by examiner

FIG. 7

| Campaign ID | Package ID | Campaign details | Target VIN list | Before-update Vehicle SW ID | After-update Vehicle SW ID | Before-update ECU SW ID list | After-update ECU SW ID list |
|---|---|---|---|---|---|---|---|
| cpn_001 | pkg_001 | Text message | ... | 0001 | 0002 | ads_001,brk_001, eps_010 | ads_002,brk_005, eps_011 |
| cpn_002 | pkg_002 | Text message | ... | 1001 | 1002 | ... | ... |

8e Campaign DB

ELECTRONIC CONTROL SYSTEM FOR VEHICLE, PROGRAM UPDATE APPROVAL DETERMINATION METHOD AND PROGRAM UPDATE APPROVAL DETERMINATION PROGRAM

CROSS-REFERENCE TO RELATED APPLICATIONS

This application is a continuation application of U.S. patent application Ser. No. 17/153,341 filed Jan. 20, 2021 which is a continuation application of PCT/JP2019/028653 filed on Jul. 22, 2019, which designated the U.S and claims the benefit of priority from Japanese Patent Application No. 2018-139390 filed on Jul. 25, 2018 and Japanese Patent Application No. 2019-129974 filed on Jul. 12, 2019. The entire disclosures of all of the above applications are incorporated herein by reference.

TECHNICAL FIELD

The present disclosure relates to an electronic control system for vehicle, a program update approval determination method and a program update approval determination program.

BACKGROUND

There is a proposed technology in which a vehicular master device serving as a relay device is provided to a vehicle and the vehicular master device distributes, to a rewrite target ECU (Electronic Control Unit), update data wirelessly received from a center device, so that rewriting of a program of the rewrite target ECU is performed by OTA (Over The Air).

SUMMARY

The present disclosure relates to an electronic control system for vehicle, a program update approval determination method and a program update approval determination program.

An example of the electronic control system includes a center device that manages a program update of a vehicle, and a vehicular master device that is communicable with the center device. Responsive to a user giving approval for program update by using a device not being a possession owned by the user, the center device receives approval information of the user, and stores in an approval information storage and manages the received approval information in association with vehicle information of the user. The center device transmits the approval information to the user's vehicle side. When the vehicular master device receives the approval information, the vehicular master device performs rewriting of the program.

An example of the program update approval determination method is a method in an electronic control system for vehicle, the system including a center device that manages a program update of a vehicle and a vehicular master device that is communicable with the center device, the method comprising: responsive to a user giving approval for program update by using a device not being a possession owned by the user, receiving approval information of the user; in association with vehicle information of the user, storing in an approval information storage and managing the approval information; transmitting the approval information to the user's vehicle side; executing reception of the approval information transmitted from the center device; and performing rewriting of the program when the approval information is received by the executing of the reception.

An example of the program update approval determination program causes an electronic control system for vehicle, the system including a center device that manages a program update of a vehicle and a vehicular master device that is communicable with the center device, to perform: responsive to a user giving approval for program update by using a device not being a possession owned by the user, receiving approval information of the user; in association with vehicle information of the user, storing in an approval information storage and managing the approval information; transmitting the approval information to the user's vehicle side; executing reception of the approval information transmitted from the center device; and performing rewriting of the program when the approval information is received by the executing of the reception.

BRIEF DESCRIPTION OF DRAWINGS

Objects, features and advantages of the present disclosure will become more apparent from the following detailed description made with reference to the accompanying drawings. In the drawing:

FIG. 7 is a diagram illustrating a campaign database.

DETAILED DESCRIPTION

Figure 1:
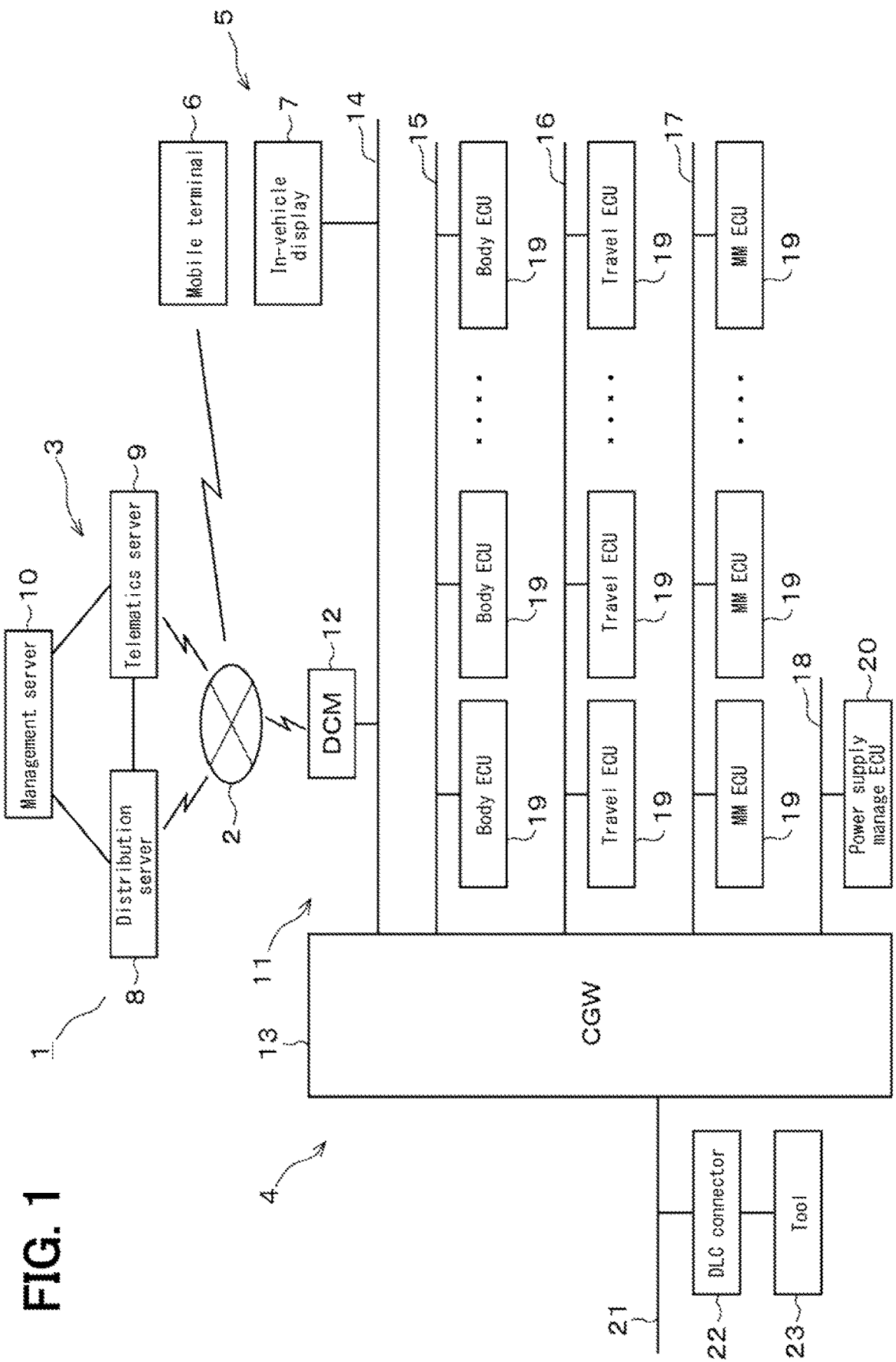
FIG. 1 is a diagram illustrating an overall configuration of one embodiment.

In recent years, the scale of a program for vehicle control, diagnosis, and the like provided in an electronic control unit (hereinafter, referred to as an ECU (Electronic Control Unit)) of a vehicle has been increased due to the diversification of vehicle control such as a driving support function and an autonomous driving function. In addition, with the version upgrade due to functional improvement and the like, an opportunity to rewrite (reprogram) a program of an ECU has been increased. Meanwhile, with the development of communication networks, a connected car technology has also become widespread. In light of such circumstances, there is a proposed technology in which a vehicular master device serving as a relay device is provided on a vehicle side and the vehicular master device distributes, to a rewrite target ECU, update data wirelessly received from a center device, so that the rewriting of a program of the rewrite target ECU is performed by OTA (Over The Air).

In a procedure of rewriting a program of an ECU by the OTA, user's approval is required before rewriting the program, and the rewriting of the program is performed on condition that the approval for the program update is obtained from the user. Specifically, a campaign notification indicating that a program rewriting is available is given via a mobile terminal and/or an in-vehicle display, and the rewriting of the program is performed when the user gives approval for program update by using the mobile terminal and/or the in-vehicle display.

In a configuration in which the campaign notification is given via the mobile terminal and/or the in-vehicle display, a user who does not have his/her own mobile terminal or a user of a vehicle not equipped with the in-vehicle display cannot recognize the campaign notification. Therefore, it is not possible to give approval for program update, and the opportunity to rewrite the program is missed.

The present disclosure is made in view of the above circumstances, and an object of the present disclosure is to provide an electronic control system for vehicle, a program update approval determination method, and a program update approval determination program that make it possible for even a user who does not have his/her own mobile terminal or a user of a vehicle not equipped with an in-vehicle display to give approval for program update and that make it possible to appropriately perform rewriting of a program.

In an aspect of the present disclosure, a center device manages a program update of a vehicle. A vehicular master device is communicable with the center device. Responsive to a user giving approval for program update by using a first device not being a possession owned by the user, an approval information receiving unit in the center device receives approval information of the user as first approval information. When the first approval information is received by the approval information receiving unit, an approval information management unit stores in an approval information storage unit and manages the received first approval information in association with vehicle information of the user. An approval information transmission unit transmits the first approval information to the user's vehicle side. In the vehicular mater device, an approval information reception unit executes reception of the first approval information transmitted from the center device. When the first approval information is received by the approval information reception unit, a program rewrite unit performs rewriting of the program.

When a user gives approval for program update by using the first device, the first approval information is transmitted from the center device to the vehicular master device, and when the first approval information is received by the vehicular master device, the rewriting of the program is performed. Even a user who does not have his/her own mobile terminal or a user of a vehicle not equipped with an in-vehicle display can give the approval for program update by using the first device, and it is possible to appropriately perform rewriting of a program.

Hereinafter, an embodiment of the present disclosure will be described with reference to the drawings. A program rewriting system for vehicle (corresponding to an electronic control system for vehicle) is a system that can rewrite, by OTA (Over The AIR), an application program for vehicle control, diagnosis, etc. provided in an electronic control unit (hereinafter referred to as an ECU (Electronic Control Unit)). The present embodiment illustrates cases of rewriting an application program in a wired manner or a wireless manner, but is applicable to cases of rewriting data used by various applications in the wired manner or the wireless manner, such as, for example, map data used by a map application, a control parameter used by an ECU, and the like.

The rewriting of an application program in the wired manner includes not only acquiring and rewriting the application program from the outside of a vehicle in the wired manner but also acquiring and rewriting various data for use in execution of the application program from the outside of the vehicle in the wired manner. The rewriting of the application program in the wireless manner includes not only acquiring and rewriting an application program from the outside of a vehicle in the wireless manner but also acquiring and rewriting various data used for use in execution of the application program from the outside of the vehicle in the wireless manner.

As illustrated in FIG. 1, a vehicle program rewriting system 1 includes a center device 3 on a communication network 2 side, a vehicle-side system 4 on a vehicle side, and a display terminal 5. The communication network 2 is configured to include, for example, a mobile communication network such as a 4G line and the like, the Internet, WiFi (Wireless Fidelity) (registered trademark), etc.

The display terminal 5 is a terminal having a function of receiving operation input from a user and a function of displaying various screens, and is, for example, a mobile terminal 6 (corresponding to a second device) portable by a user such as a smartphone or a tablet computer, and an in-vehicle display 7 (corresponding to a third device) disposed in a vehicle compartment. The mobile terminal 6 can perform data communication with the center device 3 when the mobile terminal 6 is within a communication area of the mobile communication network. The in-vehicle display 7 is connected to the vehicle-side system 4 and may be configured to have a navigation function also. The in-vehicle display 7 may be an in-vehicle display ECU having an ECU function, and may have a function of controlling display on a center display, a meter display, etc.

When a user is located outside the vehicle compartment and is within the communication area of the mobile communication network, the user can perform operation input while checking various screens related to rewriting of an application program with the mobile terminal 6, and can perform a procedure related to the rewriting of the application program. In the vehicle compartment, the user can perform operation input while checking various screens related to rewriting of the application program with the in-vehicle display 7, and can perform a procedure related to rewriting of the application program. Specifically, depending on whether a user is outside the vehicle compartment or in the vehicle compartment, the user can selectively use the mobile terminal 6 or the in-vehicle display 7, and can perform a procedure related to rewriting of the application program.

In the vehicle program rewriting system 1, the center device 3 controls a program update function of the communication network 2 side, and functions as an OTA center. The center device 3 includes a file server 8, a web server 9, and a management server 10, and each of the servers 8 to 10 is configured to be able to perform data communication with each other. Specifically, the center device 3 is configured to include a plurality of different servers having different functions.

The file server 8 is a server that manages a file of an application program distributed from the center device 3 to the vehicle-side system 4. The file server 8 manages: update data (hereinafter, also referred to as reprogramming data or write data) provided from a supplier or the like, which is a provider of an application program distributed from the center device 3 to the vehicle-side system 4; distribution specification data provided from an original equipment manufacturer (OEM); vehicle conditions acquired from the vehicle-side system 4; and the like. The file server 8 can perform data communication with the vehicle-side system 4 via the communication network 2, and transmits a distribution package in which the reprogramming data and the distribution specification data are packaged into one file to the vehicle-side system 4 when a download request for the distribution package is generated.

The web server 9 is a server that manages web information. The web server 9 transmits web data managed thereby in response to a request from a web browser of the mobile terminal 6 or the like. The management server 10 is a server that manages personal information of a user registered in a service of rewriting an application program, a rewrite history of an application program for each vehicle, and the like.

The vehicle-side system 4 includes a master device 11 (corresponding to a vehicular master device). The master device 11 includes a data communication module (DCM) 12 (corresponding to a vehicle-mounted communication device) and a central gateway (CGVV) 13 (corresponding to a vehicle gateway device). The DCM 12 and the CGW 13 are connected to each other via a first bus 14 to be able to perform data communication. The DCM 12 performs data communication with the center device 3 via the communication network 2. When the DCM 12 downloads the distribution package from the file server 8, the DCM extracts write data from the downloaded distribution package and transfers the extracted write data to the CGW 13.

The CGW 13 has a data relay function, and, when the write data is acquired from the DCM 12, the CGW instructs a rewrite target ECU, a rewrite target of an application program, to write the acquired write data, and distributes the write data to the rewrite target ECU. When writing of the write data has been completed in the rewrite target ECU and rewriting of the application program has been completed, the CGW 13 instructs the rewrite target ECU to perform activation to enable the application program after the completion of the rewriting.

In the vehicle program rewriting system 1, the master device 11 controls a program update function of the vehicle side, and functions as an OTA master. In FIG. 1, although the DCM 12 and the in-vehicle display 7 are configured to be connected to the same first bus 14 as an example, the DCM 12 and the in-vehicle display 7 may be configured to be connected to different buses. The CGW 13 may have some or all of the functions of the DCM 12, or the DCM 12 may have some or all of the functions of the CGW 13. Specifically, in the master device 11, the division of the functions between the DCM 12 and the CGW 13 may be configured in any manner. The master device 11 may be configured with two ECUs such as the DCM 12 and the CGW 13, or may be configured with a single integrated ECU having the functions of the DCM 12 and the functions of the CGW 13.

The CGW 13 is connected to a second bus 15, a third bus 16, a fourth bus 17, and a fifth bus 18 in addition to the first bus 14 as buses inside the vehicle, and is connected to various ECUs 19 via the buses 15 to 17, and connected to a power supply management ECU 20 via the bus 18.

The second bus 15 is, for example, a body system network bus. The ECUs 19 connected to the second bus 15 are ECUs controlling a body system. The ECUs controlling the body system include, for example, a door ECU controlling locking/unlocking of a door, a meter ECU controlling display on the meter display, an air conditioner ECU controlling driving of an air conditioner, a window ECU controlling opening and closing of a window, and a security ECU driven to prevent theft of the vehicle.

The third bus 16 is, for example, a travel system network bus. The ECUs 19 connected to the third bus 16 are ECUs controlling a travel system. The ECUs controlling the travel system include, for example, an engine ECU controlling driving of an engine, a brake ECU controlling driving of a brake, an electronic controlled transmission (ECT) ECU controlling driving of an automatic transmission, and a power steering ECU controlling a driving of a power steering.

The fourth bus 17 is, for example, a multimedia system network bus. The ECUs 19 connected to the fourth bus 17 are ECUs controlling a multimedia system. The ECUs controlling the multimedia system include, for example, a navigation ECU controlling a navigation system, and an ETC ECU controlling an electronic toll collection system (ETC) (registered trademark). The buses 15 to 17 may be system buses other than the body system network bus, the travel system network bus, and the multimedia system network bus. The number of buses and the number of the ECUs 19 are not limited to the exemplified configuration. The power supply management ECU 20 is an ECU that manages power to be supplied to the DCM 12, the CGW 13, the various ECUs 19, and the like.

A sixth bus 21 is connected to the CGW 13 as a bus outside the vehicle. A data link coupler (DLC) connector 22 to which a tool 23 (corresponding to a service tool) is detachably connected is connected to the sixth bus 21. The buses 14 to 18 inside the vehicle and the bus 21 outside the vehicle are configured with, for example, Controller Area Network (CAN) (registered trademark) buses, and the CGW 13 performs data communication with the DCM 12, the various ECUs 19, and the tool 23 in accordance with the CAN data communication standard and the diagnosis communication standard (Unified Diagnosis Services (UDS): ISO14229). The DCM 12 and the CGW 13 may be connected to each other via Ethernet, and the DLC connector 22 and the CGW 13 may be connected to each other via Ethernet.

When write data is received from the CGW 13, the rewrite target ECU 19 writes the received write data into a flash memory (corresponding to a non-volatile memory) to rewrite an application program. In the above configuration, when a request for acquiring write data is received from the rewrite target ECU 19, the CGW 13 functions as a reprogramming master that distributes the write data to the rewrite target ECU 19. When the write data is received from the CGW 13, the rewrite target ECU 19 functions as a reprogramming slave that writes the received write data into the flash memory to rewrite the application program.

Figure 2:
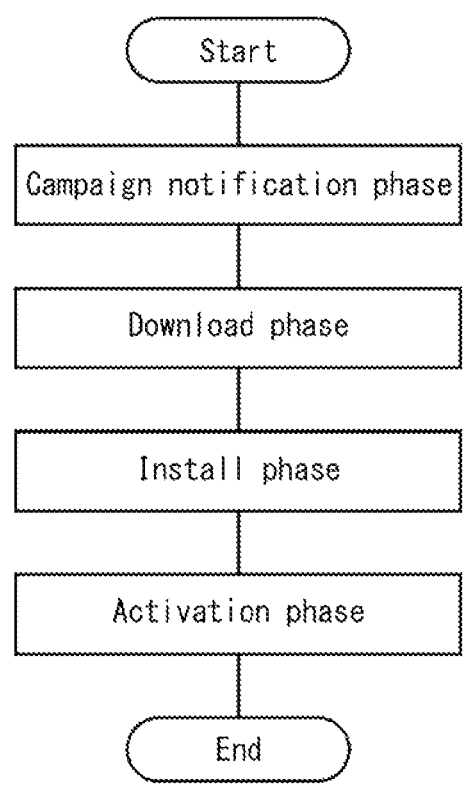
FIG. 2 is a diagram illustrating a procedure of rewriting an application program.

In the manner of wirelessly rewriting the application program, a campaign notification indicating that the rewriting of the application program is available is given via the mobile terminal 6 or the in-vehicle display 7. When a user recognizes the campaign notification with the mobile terminal 6 or the in-vehicle display 7 and gives approval for program update by using the mobile terminal 6 or the in-vehicle display 7, the rewriting of the application program is performed. Specifically, on the condition that the approval for program update is obtained from a user, the master device 11 performs the rewriting of the application by, after performing a campaign notification phase, performing a download phase, an installation phase, and an activation phase in order, as illustrated in FIG. 2, wherein downloading of the distribution package from the center device 3 to the vehicle side is performed in the download phase, distribution of write data from the CGW 13 to a rewrite target ECU 19 is performed in the installation phase, and start of a new application program is included in the activation phase.

Figure 3:
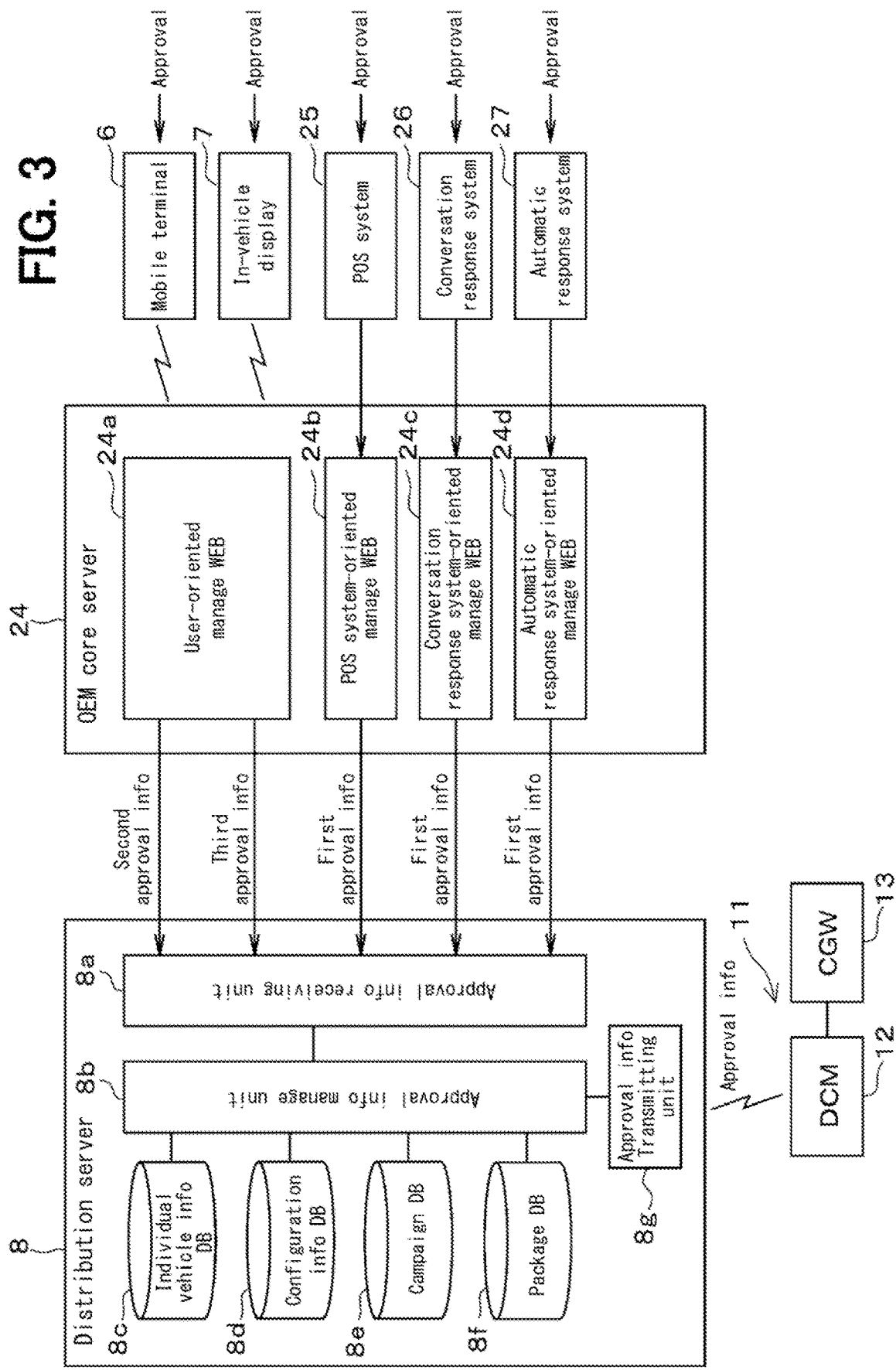
FIG. 3 is a functional block diagram of a distribution server and an OEM core server.

As illustrated in FIG. 3, the OEM core server 24 managed by the OEM is connected to the distribution server 8. The OEM core server 24 includes a user-oriented management WEB 24a and has a function of executing, when the mobile terminal 6 or the in-vehicle display 7 is connected in a data communicable manner, reception of a program update approval that is given by a user using the mobile terminal 6 or the in-vehicle display 7. When the user-oriented management WEB 24a determines that a user has approved a program update by using the mobile terminal 6, the management WEB 24a transmits approval information indicating that the user has approved the program update by using the mobile terminal 6 (corresponding to second approval information) to the distribution server 8. In this case, when approving the program update, the user can select, for example, collective approval or separate approval and can set a start timing of the installation phase. The collective approval is collectively approving all of the campaign notification phase, the download phase, the installation phase, and the activation phase. The separate approval is separately approving a respective one of the campaign notification phase, the download phase, the installation phase, and the activation phase. For example, a user may select the collective approval when he/she cannot afford to see the program update to the end, and may select the separate approval when he/she can afford to see the program update to the end.

Further, when the user-oriented management WEB 24a determines that a user has approved a program update by using the in-vehicle display 7, the user-oriented management WEB 24a transmits approval information indicating that the user has approved the program update by using the in-vehicle display 7 (corresponding to third approval information) to the distribution server 8. In this case also, when approving the program update, the user can select collective approval or separate approval and can set a start timing of the installation phase, as is the case where a user gives approval for program update by using the mobile terminal 6.

As described above, in a configuration in which the campaign notification is given via the mobile terminal and/or the in-vehicle display, a user who does not have his/her own mobile terminal or a user of a vehicle not equipped with the in-vehicle display cannot recognize the campaign notification. In this case, it is impossible to give approval for program update, and the opportunity to rewrite the program is missed. In view of this, the present embodiment is characterized by the below-described configuration.

Figure 4:
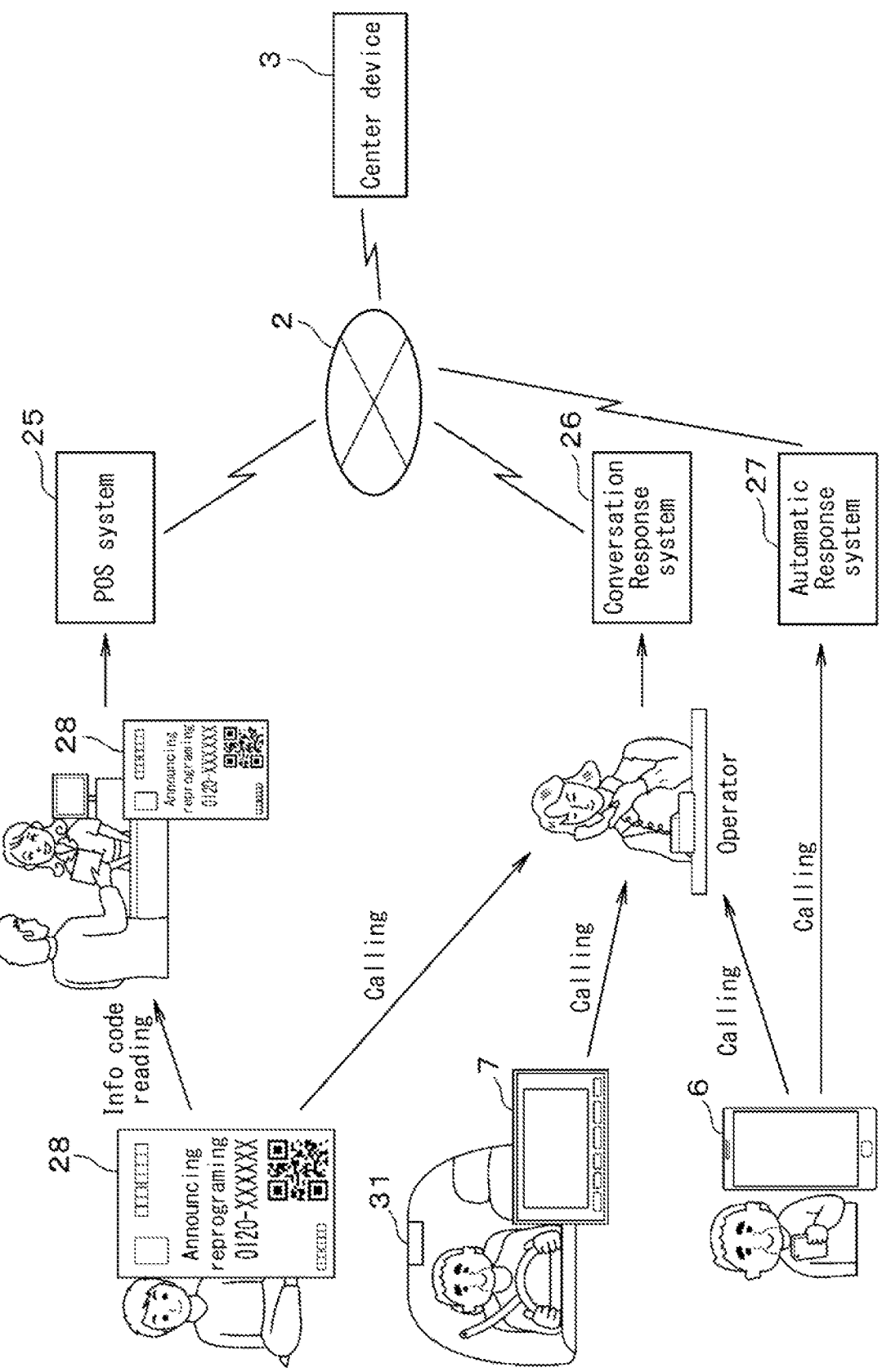
FIG. 4 is a diagram illustrating a flow of approval.

As illustrated in FIG. 4, the center device 3 is configured to able to perform data communication with a POS (Point Of Sale) system 25 (corresponding to a first device), a conversation response system 26 (corresponding to the first device), and an automatic response system 27 (corresponding to the first device) via the communication network 2. In the present embodiment, a campaign notification indicating that rewriting of an application program is available is given to a user via the mobile terminal 6 or the in-vehicle display 7, and further, a postcard 28 informing contents of the campaign notification is mailed to the user. On the postcard 28 mailed to the user, a telephone number of contact information for a service operator (in FIG. 4, "0120-XXXXXX (X is from "0" to "9")") and a QR code (registered trademark) in which user's personal information, vehicle information and authentication information are encoded are printed.

When the user brings the postcard 28 to a store such as a convenience store and scans the QR code printed on the postcard 28 with a scanner, the POS system 25 executes reception of the program update approval by scanning the QR code with the scanner, and transmits the read user's personal information etc., as approval information to the center device 3 via the communication network 2. Specifically, the user can notify the center device 3 of his/her intention to approve the program update via the POS system 25 by scanning the QR code printed on the postcard 28 with the scanner.

Further, when the user inputs the telephone number printed on the postcard 28 on, for example, a mobile phone or a fixed telephone, the telephone device makes a call using the telephone number input by the user as the destination telephone number, and the user becomes able to talk with the operator when the operator responds. When the operator verbally explains the contents of the campaign notification to the user, the user can understand the contents of the campaign notification and can select whether or not to approve the program update. When the user informs the operator of the intention to approve the program update, the operator operates the conversation response system 26 and inputs the user's personal information and the like. When the user's personal information and the like is input, the conversation response system 26 transmits the input user's personal information and the like as approval information to the center device 3 via the communication network 2. Specifically, the user can notify the center device 3 of the intention to approve the program update via the conversation response system 26 by calling the telephone number printed on the postcard 28.

Further, it is possible without via the operator of the conversation response system 26. When the user inputs the telephone number printed on the postcard 28, for example, into a mobile phone or a fixed telephone, the telephone device makes a call using the telephone number input by the user as the destination telephone number, and the automatic response system 27 responds. The automatic response system 27 outputs voice guidance according to a procedure of automatic response registered in advance, and the user inputs the user's personal information and the like by operating, for example, the mobile phone or the fixed telephone following the voice guidance. When the user's personal information and the like is input, the automatic response system 27 transmits the input user's personal information and the like as approval information to the center device 3 via the communication network 2. Specifically, the user can notify the center device 3 of the intention to approve the program update via the automatic response system 27 by calling the telephone number printed on the postcard 28. The user may be able to select whether to use the conversation response system 26 or the automatic response system 27, and a system in which conversation with the operator and output of voice guidance are mixed may be adopted.

When the user gives approval for program update by using the POS system 25, the conversation response system 26, the automatic response system 27 in this way, the user can select the collective approval or the separate approval and can set a start timing of the installation phase, as is the case where a user gives approval for program update by using the mobile terminal 6 or the in-vehicle display 7. In the cases of using the POS system 25, when the user scans the QR code printed on the postcard 28 with a scanner for example, the user may inform a shop clerk of the shop of whether it is the collective approval or the separate approval and the start timing of the installation phase, and the shop clerk may register the information conveyed from the user in the POS system 25. In the cases of using the conversation response system 26, when the user talks with the operator, the user may inform the operator of whether it is the collective approval or the separate approval and the start timing of the installation phase, and the operator may register the information conveyed from the user in the conversation response system 26. In the cases of using the automatic response system 27, when the user operates the telephone device following the voice guidance, the user may register in the automatic response system 27 whether it is the collective approval or the separate approval and the start timing of the installation phase.

In addition to the user-oriented management WEB 24*a*, the OEM core server 24 has a function of executing reception of approval for a program update using the POS system 25, the conversation response system 26, and the automatic response system 27 as described above. Specifically, the OEM core server 24 includes a management WEB 24*b* for POS system, a management WEB 24*c* for conversation response system, and a management WEB 24*d* for automatic response system. When the user gives approval for program update by using the POS system 25, the management WEB 24*a* for POS system transmits the approval information (corresponding to first approval information) to the distribution server 8. When the user gives approval for program update by using the conversation response system 26, the management WEB 24*c* for conversation response system transmits the approval information (corresponding to first approval information) to the distribution server 8. When the user gives approval for program update by using the automatic response system 27, the management WEB 24*d* for automatic response system transmits the approval information (corresponding to first approval information) to the distribution server 8.

The distribution server 8 includes an approval information receiving unit 8*a*, an approval information management unit 8*b*, various databases 8*c* to 8*f*, and an approval information transmission unit 8*g*. When the approval information receiving unit 8*a* receives the approval information from the OEM core server 24, the approval information receiving unit 8*a* outputs the received approval information to the approval information management unit 8*b*. When the approval information is input from the approval information receiving unit 8*a*, the approval information management unit 8*b* stores and manage the input approval information in a corresponding database(s) of the databases 8*c* to 8*f*. Specifically, the approval information management unit 8*b* analyzes the approval information to determine which of the mobile terminal 6, the in-vehicle display 7, the POS system 25, the conversation response system 26, and the automatic response system 27 was used by the user in approving the program update.

Figure 5:
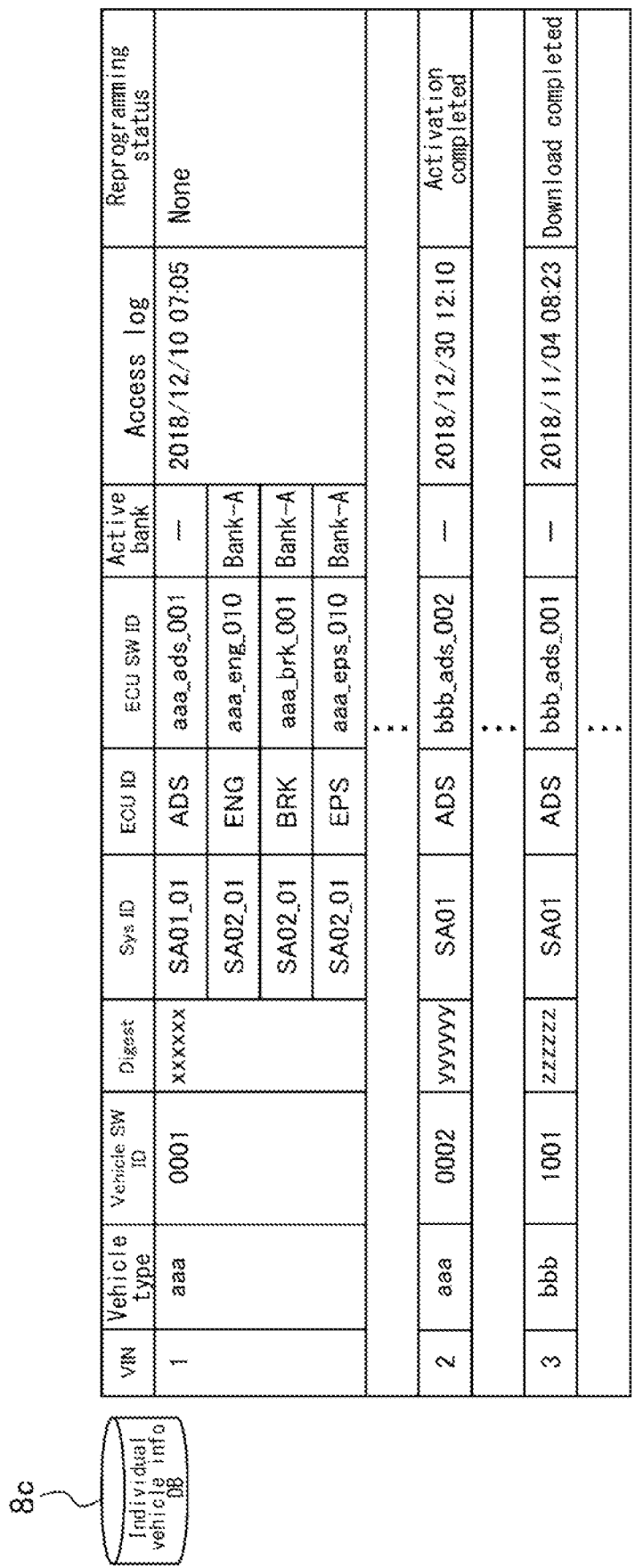
FIG. 5 is a diagram illustrating an individual vehicle information database.

The various databases 8*c* to 8*f* include an individual vehicle information database 8*c*, a configuration information database 8*d*, a campaign database 8*e*, and a package database 8*f*. The individual vehicle information database 8*c* is a database for managing individual vehicle information, and as shown in FIG. 5, the data items includes "VIN", "vehicle type", "Vehicle SW ID", "Sys ID", "ECU ID", "ECU SW ID", "active bank", "access log", and "reprograming status".

The "VIN" is identification information assigned on a vehicle-by-vehicle basis. The "vehicle type" is information indicating vehicle type. The "Vehicle SW ID" is a software ID of a vehicle as a whole and an ID for identifying the software, and only one "vehicle SW ID" is given to a respective vehicle, and is updated as the version of an application program of any one or more of the ECUs is updated.

The "Sys ID" is an ID of a system when a group of a plurality of ECUs 19 mounted to a respective vehicle is referred to as a "system". For example, when a group of body system ECUs 19 is a body system, and a group of travel system ECUs 19 is a travel system, the ID is for identifying the system. The "Sys ID" is updated as the version of an application program of any one or more ECUs forming a system is updated.

The "ECU ID" is an ID for device identification, indicating the type of ECU. The "ECU SW ID" is a software ID for a respective ECU and is updated as a version of an application program of that ECU is updated. Even if the same program version is used in the same "ECU ID", different "ECU SW IDs" are used when hardware configurations are different from each other. Specifically, the "ECU SW ID" is also information indicating a product number of the ECU.

In a case where a memory configuration is a double-bank, the "active bank" is a bank in which there is a written program currently operated by the ECU 19, and a value uploaded together with configuration information is registered. The "access log" is the date and time when the vehicle uploaded the individual vehicle information to the center device 3. The "reprogramming status" indicates a status of reprogramming in the vehicle, and includes, for example, "campaign issued", "activation completed", "download completed", etc. In that regard, when a user gives approval for program update by using any of the mobile terminal 6, the in-vehicle display 7, the POS system 25, the conversation response system 26, and the automatic response system 27, the "reprogramming status" is updated in accordance with the progress of the program update. The reprogramming status can tell which phase the program update has progressed to and in which phase the program update is stagnant.

Figure 6:
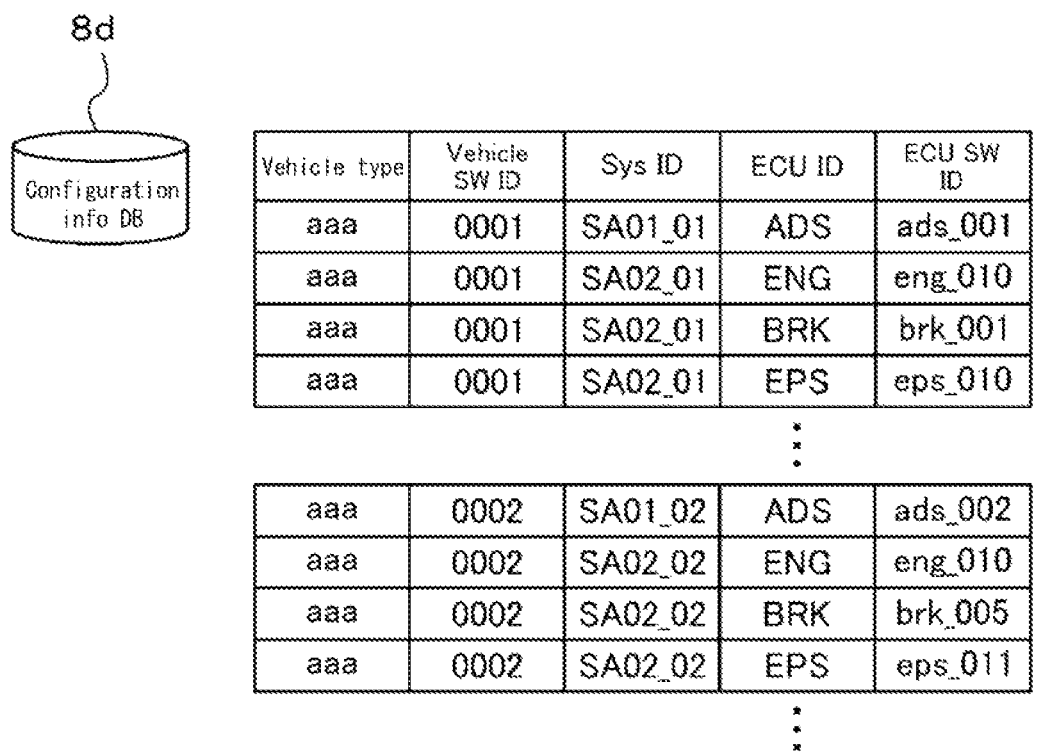
FIG. 6 is a diagram illustrating a configuration information database.

The configuration information database 8*d* is a database that manages configuration information, and as shown in FIG. 6, includes "vehicle type", "Vehicle SW ID", "System ID", "ECU ID", and "ECU SW" as the data items. FIG. 6 illustrates the configuration information regarding a vehicle of "vehicle type"="aaa". Among the ECUs 19 mounted to the vehicle, an automatic driving ECU (ADS), an engine ECU (ENG), a brake ECU (BRK), and an electric power steering ECU (EPS) are illustrated. For example, the "ECU SW IDs" of "Vehicle SW ID"="0001" are "ads_001", "eng_010", "brk_001", "eps_010", whereas the "ECU SW IDs" of "Vehicle SW ID"="0002" are "ads_002", "eng_010", "brk_005", and "eps_011", and three software versions have been updated. Along with this, "Sys ID"="SA01_01" is updated to "SA01_02", and "Sys ID"="SA02_01" is updated to "SA02_02".

The campaign database 8*e* is a database that manages information related to campaigns, and as shown in FIG. 7, includes "campaign ID", "package ID", "campaign content", "target VIN list", "before-update Vehicle SW ID", "after-update Vehicle SW ID", "before-update Vehicle SW ID list", and "after-update Vehicle SW ID list" as the data items. Each of these data items of the campaign databases may be registered to conform with the data items of the package database 8f described later.

The "campaign ID" is identification information for identifying the campaign. The "package ID" is identification information for identifying the package. The "campaign content" is message information such as a text message and the like indicating the content of the program update. The "target VIN list" is a list of "VINs" being the IDs of the vehicles targeted for the campaign. The "before-update Vehicle SW ID" is the "Vehicle SW ID" before the program update, and the "after-update Vehicle SW ID" is the "Vehicle SW ID" after the program update. The "before-update Vehicle SW ID list" is a list of "Vehicle SW IDs" before the program update, and the "after-update Vehicle SW ID list" is a list of "Vehicle SW IDs" after the program update.

Figure 8:
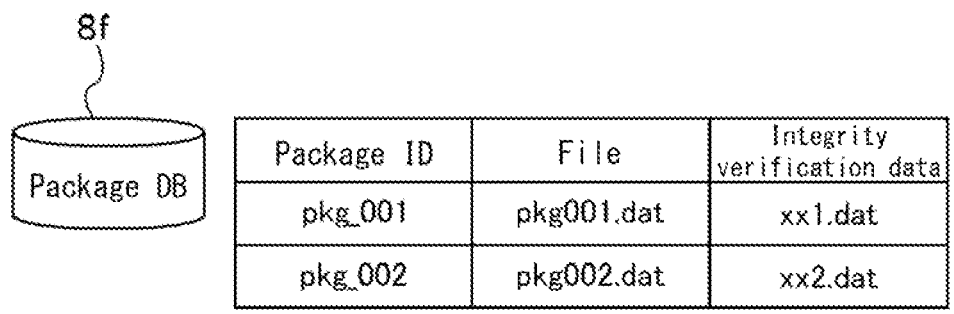
FIG. 8 is a diagram illustrating a package database.

The package database 8f is a database that manages information related to packages, and includes "package ID", "file", and "integrity verification data" as data items as shown in FIG. 8. The "package ID" is identification information for identifying the distribution package. The "file" is a file stored in a distribution package. The "integrity verification data" is data for verifying the integrity of the distribution package.

In the above configuration, when the user gives approval for program update by using any of the mobile terminal 6, the in-vehicle display 7, the POS system 25, the conversation response system 26, and the automatic response system 27, the distribution server 8 updates "reprograming status" of the individual vehicle information database 8c, as an example. Following the updating of "reprograming status", relevant data items of the configuration information database 8d, the campaign database 8e, and the package database 8f may be updated. Further, as a database configuration, a database for managing approval information may be prepared separately from the individual vehicle information database 8c, the configuration information database 8d, the campaign database 8e, and the package database 8f.

After the various databases 8c to 8f are updated due to the user giving the approval for the program update by using any of the mobile terminal 6, the in-vehicle display 7, the POS system 25, the conversation response system 26, and the automatic response system 27, the approval information transmission unit 8g transmits approval information to the master device 11. In the above description, when the user gives approval for program update by using the in-vehicle display 7, the approval information is transmitted to the master device 11 via the OEM core server 24 and the distribution server 8. The approval information may be directly transmitted to the master device 11 without via the OEM core server 24 and the distribution server 8.

Figure 9:
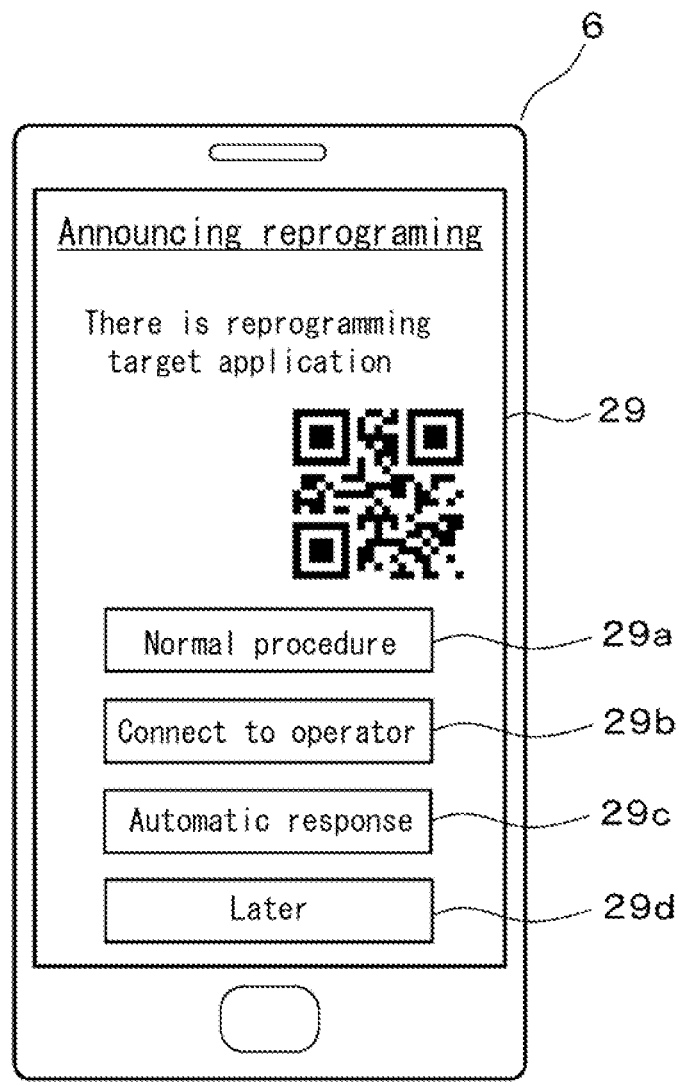
FIG. 9 is a diagram illustrating a guidance screen for a campaign notification on a mobile terminal.

Next, a guidance screen of the campaign notification displayed on the mobile terminal 6 or the in-vehicle display 7 will be described. As shown in FIG. 9, when the guidance screen 29 of the campaign notification is displayed on the mobile terminal 6, a "normal procedure" button 29a, a "connect to operator" button 29b, an "automatic response" button 29c, and a "later" button 29d are displayed, so that a user can select any of the buttons. When the user operates the "normal procedure" button 29a, the user subsequently conducts operation for approving the program update by using the mobile terminal 6.

In another case where the user operates the "connect to operator" button 29b, the mobile terminal 6 makes a call using a telephone number designated in advance as a destination telephone number, and when the operator responds, the user can talk with the operator. By the operator verbally explaining the content of the campaign notification to the user, the user can understand the content of the campaign notification and can select whether or not to approve the program update. Specifically, when operating the "connect to operator" button 29b on the guidance screen 29 of the mobile terminal 6, the user can notify the center device 3 of the intention to approve the program update via the conversation response system 26.

In another case where the user operates the "automatic response" button 29c, the mobile terminal 6 makes a call using a telephone number designated in advance as a destination telephone number, and when the automatic response system 27 responds, the voice guidance allows the user to understand the content of the campaign notification, and the user can select whether or not to approve the program update. Specifically, when operating the "automatic response" button 29c on the guidance screen 29 of the mobile terminal 6, the user can notify the center device 3 of the intention to approve the program update via the automatic response system 27. When the user operates the "later" button 29d, the guidance screen 29 for the campaign notification will be displayed again on the mobile terminal 6 in later timing.

Further, when a QR code similar to that on the postcard 28 is displayed on the guidance screen 29 in addition to the buttons 29a to 29d, the user may bring the mobile terminal 6 to a store such as a convenience store and cause a canner to read the QR code displayed on the mobile terminal 6, and in this case, the POS system 25 transmits the read user's personal information and the like as approval information to the center device 3 via the communication network 2. Specifically, the user can also notify the center device 3 of the intention to approve the program update via the POS system 25 by causing a scanner to read the QR code displayed on the mobile terminal 6.

Figure 10:
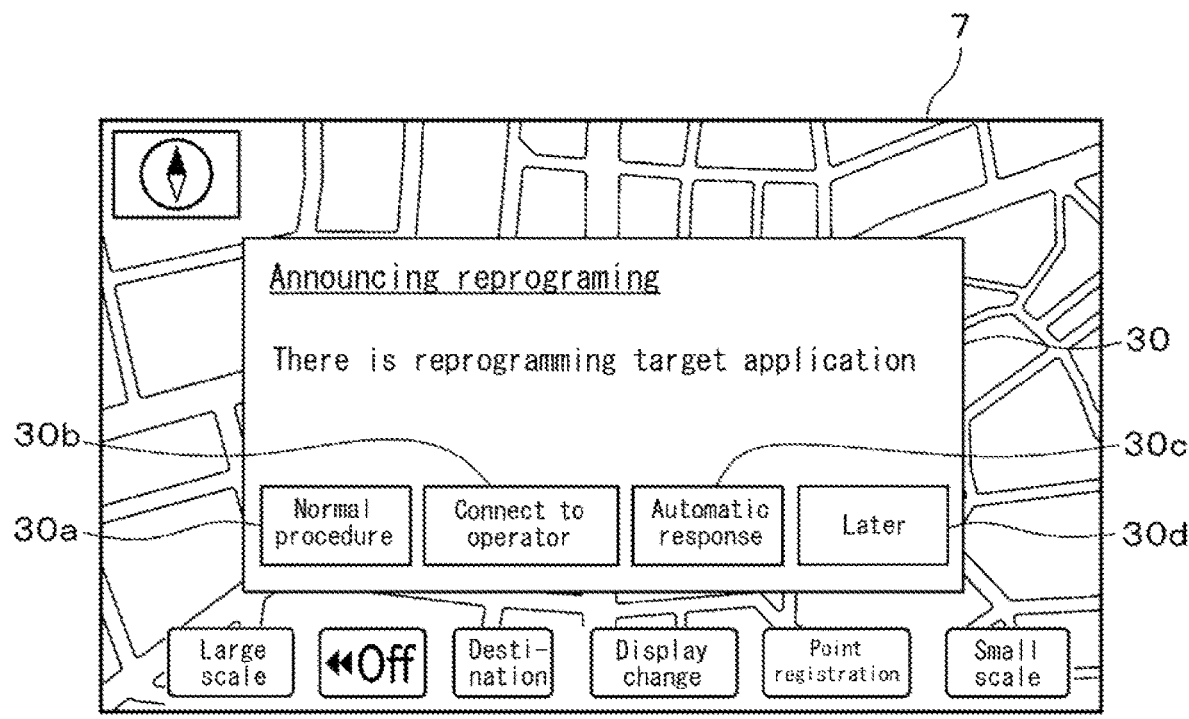
FIG. 10 is a diagram illustrating a guidance screen for a campaign notification on an in-vehicle display.

The same applies to cases where the guidance screen for the campaign notification is displayed on the in-vehicle display 7. Specifically, as illustrated in FIG. 10, when the guidance screen 30 of the campaign notification is displayed on the in-vehicle display 7, a "normal procedure" button 30a, a "connect to operator" button 30b, an "automatic response" button 30c, and a "later" button 30d are displayed, so that the user can select any of the buttons. When the user operates the "normal procedure" button 30a, the user subsequently conducts operation for giving approval for program update by using the in-vehicle display 7.

In another case where the user operates the "connect to operator" button 30b, the mobile terminal 6 makes a call using a telephone number designated in advance as a destination telephone number, and when the operator responds, the user can talk with the operator. By the operator verbally explaining the content of the campaign notification to the user, the user can understand the content of the campaign notification and can select whether or not to approve the program update. Specifically, the user can notify the center device 3 of the intention to approve the program update via the conversation response system 26 by operating the "connect to operator" button 30b on the guidance screen 30 of the mobile terminal 6. Further, when the user operates the "automatic response" button 30c, the mobile terminal 6 makes a call using a telephone number designated in advance as a destination telephone number, and when the automatic response system 27 responds, the voice guidance allows the user to understand the content of the campaign notification and to select whether to approve the program update. Specifically, the user can notify the center device 3 of the intention to approve the program update via the automatic response system 27 by operating the "automatic response" button 30c on the guidance screen 30 of the mobile terminal 6. When the user operates the "later" button 30d, the guidance screen 29 for the campaign notification will be displayed again on the mobile terminal 6 in later timing.

In cases where the guidance screen 30 is displayed on the in-vehicle display 7, it is preferable that the guidance screen 30 be displayed at a timing immediately after the user gets in the vehicle or just before getting off the vehicle, Specifically, at a timing that does not interfere with the users driving. Instead of displaying the "connect to operator" button 30b and/or the "automatic response" button 30c on the guidance screen 30, the DCM 12 may make a call using the telephone number designated in advance as the destination telephone number when the user operates a mechanical button arranged in the vehicle compartment. Specifically, for example, an overhead console 31 (see FIG. 4) is placed on the ceiling of the vehicle compartment, a lamp of an indicator announcing a campaign is light up in the meter device, and the user recognizes the light-up lamp and presses a call button of the overhead console 31, which causes the DCM 12 to make call using the telephone number designated in advance as the destination telephone number. In a configuration in which the in-vehicle display 7 is absent, the use of the overhead console 31 allows the user to give approval for program update in the vehicle compartment.

In cases where the user notifies the center device 3 of the intention to approve the program update via the POS system 25, the conversation response system 26, and the automatic response system 27 in the above manner, the content of the approval may be output to an output medium as a history. In cases of using the POS system 25, a receipt including a record of the content of the approval may be issued for example, or the content of the approval may be transferred as electronic data to the users mobile terminal 6 for example. In cases of using the conversation response system 26, the conversation content may be recorded. In cases of using the automatic response system 2, a history of the user's operation may be stored.

Figure 11:
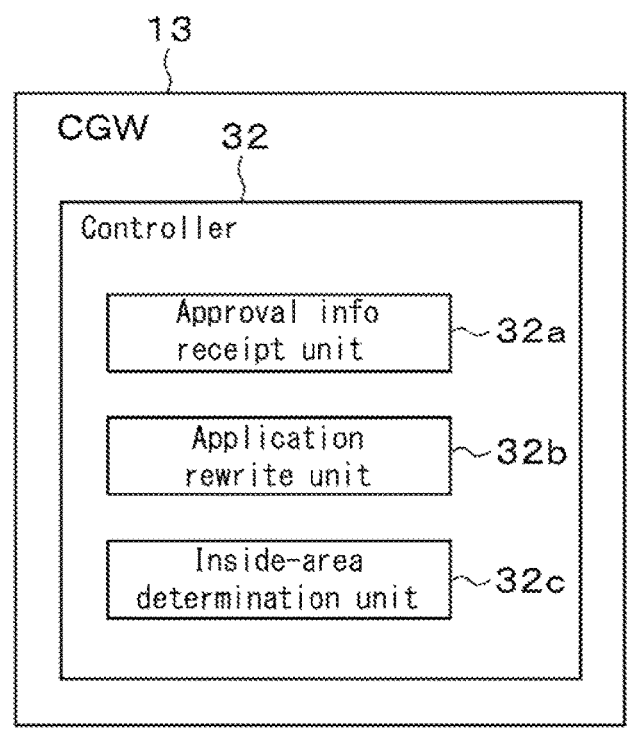
FIG. 11 is a functional block diagram of a CGW.
Figure 12:
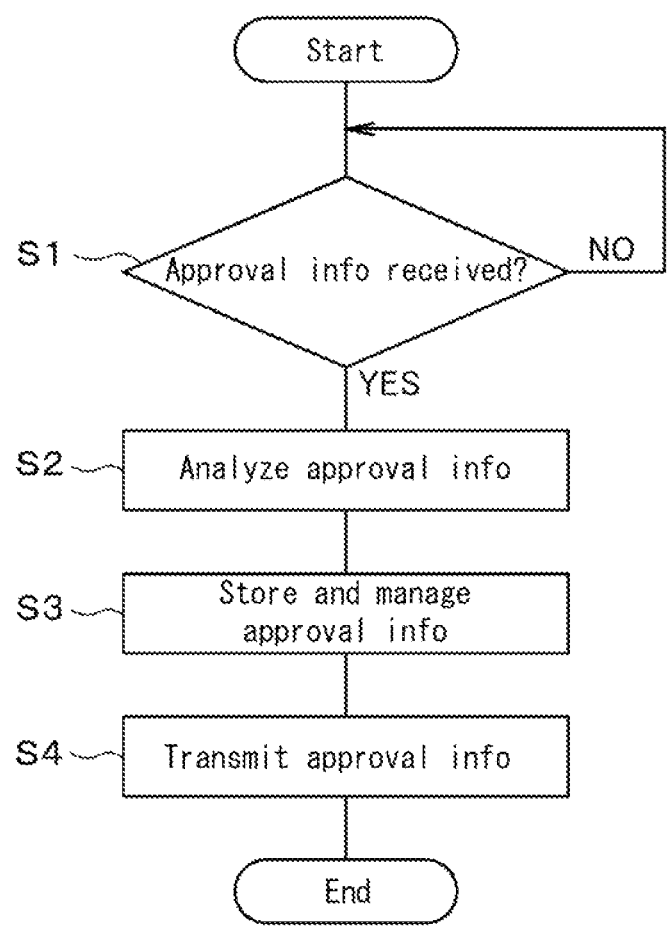
FIG. 12 is a flowchart illustrating an approval information receiving determination process of the distribution server.
Figure 13:
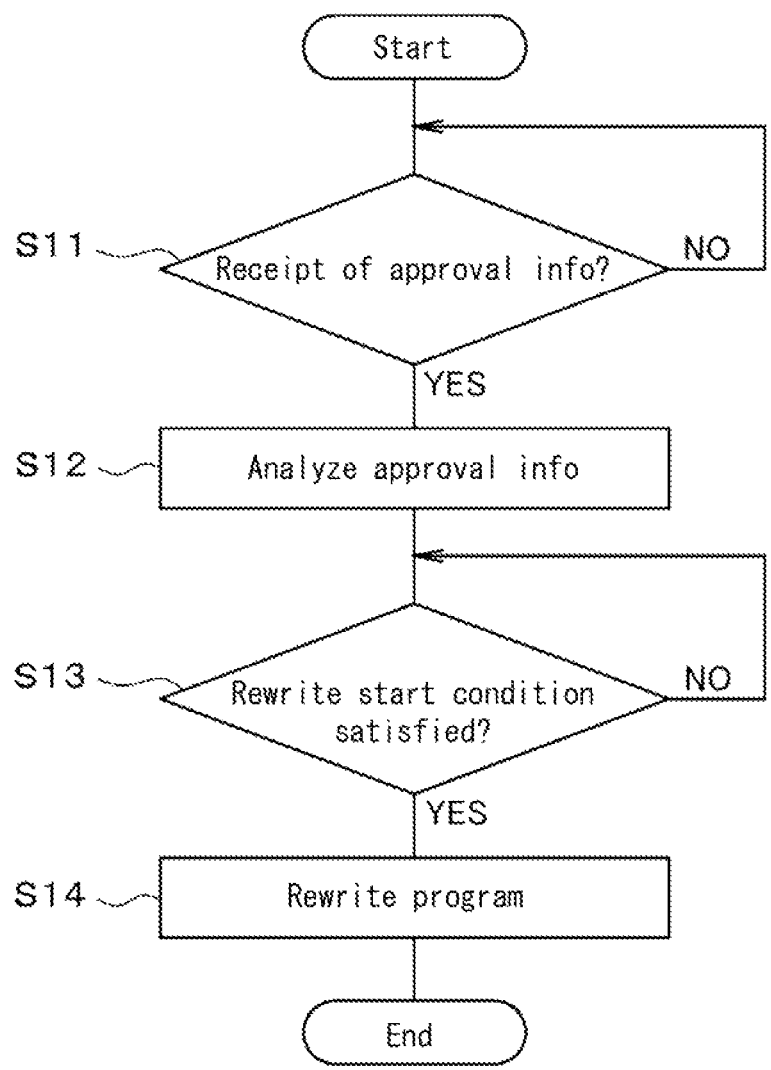
FIG. 13 is a flowchart illustrating an approval information reception determination process of the CGW.

Next, a configuration of the CGW 13 will be described as the configuration on the vehicle side. As illustrated in FIG. 11, the CGW 13 includes a controller 32. The controller 32 includes a microcomputer, including a CPU (central processing unit), a ROM (read only memory), a RAM (random access memory), and the like, and executes a control program stored in a non-transitory tangible storage medium to perform various processes and controls the operation of the CGW 13.

The controller 32 includes an approval information reception unit 32a, a program rewrite unit 32b, and an inside-area range determination unit 32c. The approval information reception unit 32a receives the approval information transmitted from the distribution server 8. The program rewrite unit 32b rewrites the program when the approval information is received by the approval information reception unit 32a. Specifically, when the user selected the collective approval, the program rewrite unit 32b performs all of the phases of rewriting of the application program at once, so that batch rewriting not requiring a phase-by-phase basis approval is performed. Specifically, when the user selected the collective approve for the program update by using the mobile terminal 6 or the in-vehicle display 7, the approval screen of the campaign notification is displayed on the mobile terminal 6 or the in-vehicle display 7 at the first place but thereafter the program update proceeds without displaying of a screen for approving the download, a screen for approving the installation nor a screen for approving the activation. On the other hand, when the user selected the separate approval, the program rewrite unit 32b perform rewriting of the application program separately on a phase-by-phase basis, so that separate rewriting requiring the phase-by-phase basis approval is performed. Specifically, when the user selected the separate approval for the program update by using the mobile terminal 6 or the in-vehicle display 7, the approval screen of the campaign notification is displayed on the mobile terminal 6 or the in-vehicle display 7 at the first place, and thereafter, the screen for approving the download, the screen for approving the installation and the screen for approving the activation are displayed sequentially, so that each time the screen is displayed, the user can gives approval, so that the program update proceeds.

The inside-area determination unit 32c determines whether or not it is within a communication area of the data communication with the outside, based on a data communication state of the DCM 12. When it is determined by the inside-area determination unit 32c that it is within the communication area of the data communication with the outside and that the data communication with the distribution server 8 is performable, the approval information reception unit 19a executes the reception of the approval used with the mobile terminal 6, the in-vehicle display 7, the POS system 25, the conversation response system 26, and the automatic response system 27. When it is determined by the inside-area determination unit 32c that it is not within the communication area of the data communication with the outside and that the data communication with the distribution server 8 is not performable, the approval information reception unit 19a executes the reception of only the approval used with the in-vehicle display 7. Next, the operation of the above configuration will be described with reference to FIGS. 12 to 16. Now, an approval information receiving determination process of the distribution server 8 will be described as the process on the center device 3 side, and the approval information reception determination process of the CGW 13 will be described as the process on the vehicle side. A program update approval determination method includes the approval information receiving determination process of the distribution server 8 and the approval information reception determination process of the CGW 13.

(1) The Approval Information Receiving Determination Process of the Distribution Server 8

Upon starting the approval information receiving determination process, the distribution server 8 determines whether or not the approval information is received from the OEM core server 24 (S1). When the distribution server 8 determines that the approval information is received from the OEM core server 24 (S1: YES, corresponding to an approval information receiving procedure), the distribution server 8 analyzes the received approval information (S2), stores and manages the approve information in the individual vehicle information database 8c in association with the vehicle information of the user, and updates the individual vehicle information database 8c (S3, corresponding to an approval information management procedure).

Specifically, when the distribution server 8 receives the second approval information from the OEM core server 24, information indicating that the user gave the approval for program update by using the mobile terminal 6 is stored in the individual vehicle information database 8c and managed by the distribution server 8. When the distribution server 8 receives the third approval information from the OEM core server 24, information indicating that the user gave the approval for program update by using the in-vehicle display 7 is stored in the individual vehicle information database 8*c* and managed by the distribution server 8. When the distribution server 8 receives the first approval information from the OEM core server 24, the distribution server 8 determines whether it was the POS system 25, the conversation response system 26 or the automatic response system 27, and information indicating that by using what system, the user gave the approval for program update is stored in the individual vehicle information database 8*c* and managed by the distribution server 8, wherein the system that was used is the POS system 25, the conversation response system 26 or the automatic response system 27. In the above cases, the distribution server 8 specifies whether the approval is the collective approval or the separate approval, and specifies the start timing of the installation phase. After storing the approval information in the individual vehicle information database 8*c* in association with the vehicle information of the user, the distribution server 8 transmits the approval information to the vehicle side (S4, corresponding to an approval information transmission procedure), and ends the approval information receiving process.

(2) Approval Information Reception Determination Process of CGW 13

Upon starting the approval information reception determination process, the CGW 13 determines whether or not the approval information is received from the distribution server 8 (S11, corresponding to an approval information reception procedure). When it is determined that that the approval information is received from the distribution server 8 (S11: YES), the CGW 13 analyzes the received approval information (S12) and determines whether or not a rewriting start condition is satisfied (S13). When it is determined that the rewriting start condition is satisfied (S13: YES) as a result of, for example, the user-designated start time of the application program rewriting being reached or the like, the CGW 13 distributes the write data to the rewrite target ECU 19 and performs rewriting of the application program of the target ECU 19 (S14, corresponding to a program rewrite procedure), and ends the approval information reception determination process.

Figure 15:
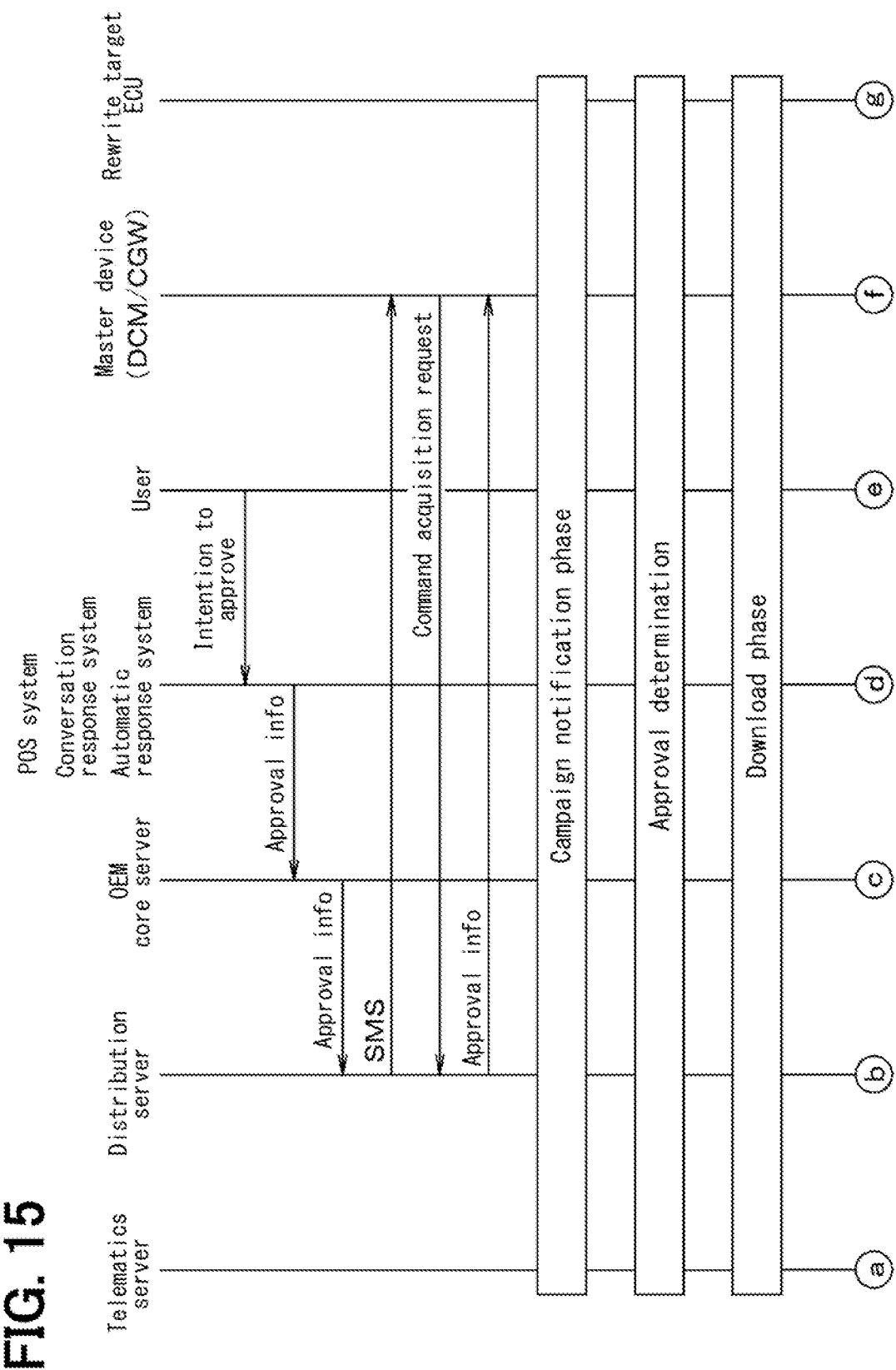
FIG. 15 is a sequence diagram (No. 2)
Figure 16:
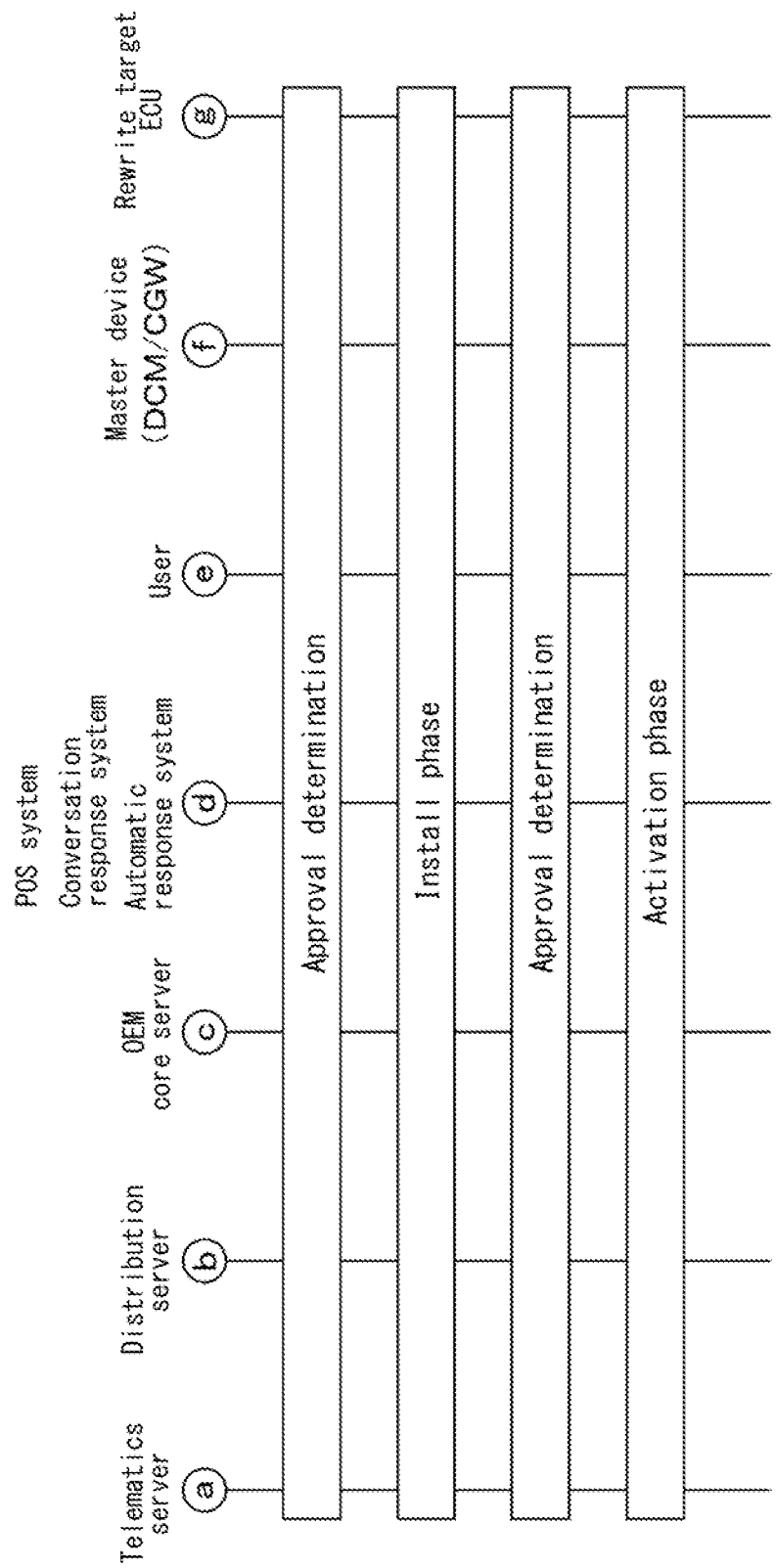
FIG. 16 is a sequence diagram (No. 3).

Cases where the user gives approval for the program update by using the POS system 25, the conversation response system 26, the automatic response system 27 will be described with reference to FIGS. 14 to 16. When the POS system 25, the conversation response system 26, or the automatic response system 27 confirms the users intention to approve the program update, it transmits the approval information to the OEM core server 24. When the OEM core server 24 receives the approval information from the POS system 25, the conversation response system 26, or the automatic response system 27, the OEM core server 24 transmits the received approval information to the distribution server 8. When the distribution server 8 receives the approval information from the POS system 25, the conversation response system 26, or the automatic response system 27, the distribution server 8 transmits an SMS (Short Message Service) signal to the DCM 12, and when the distribution server 8 receives a command acquisition request from the DCM 12, the distribution server 8 transmits the approval information to the CGW 13.

When the user gives approval for program update by using any of the mobile terminal 6, the in-vehicle display 7, the POS system 25, the conversation response system 26, and the automatic response system 27, the distribution server 8 updates the "reprogramming status" of the individual vehicle information database 8*c* in accordance with the progress of the program update as described above, so that only the earliest approval information responsive to a campaign notification is valid, and the approval information for the second time and subsequent responsive to the same campaign notification is invalid. For example, the distribution server 8 may set an approval information management flag, may change the value of the approval information management flag from "0" to "1" when receiving the earliest approval information, may determine whether it is the earliest approval information or the approval information for the second time or later responsive to a campaign notification, by making a determination on the value of the approval information management flag, and may invalidate the approval information for the second time and subsequent.

Figure 14:
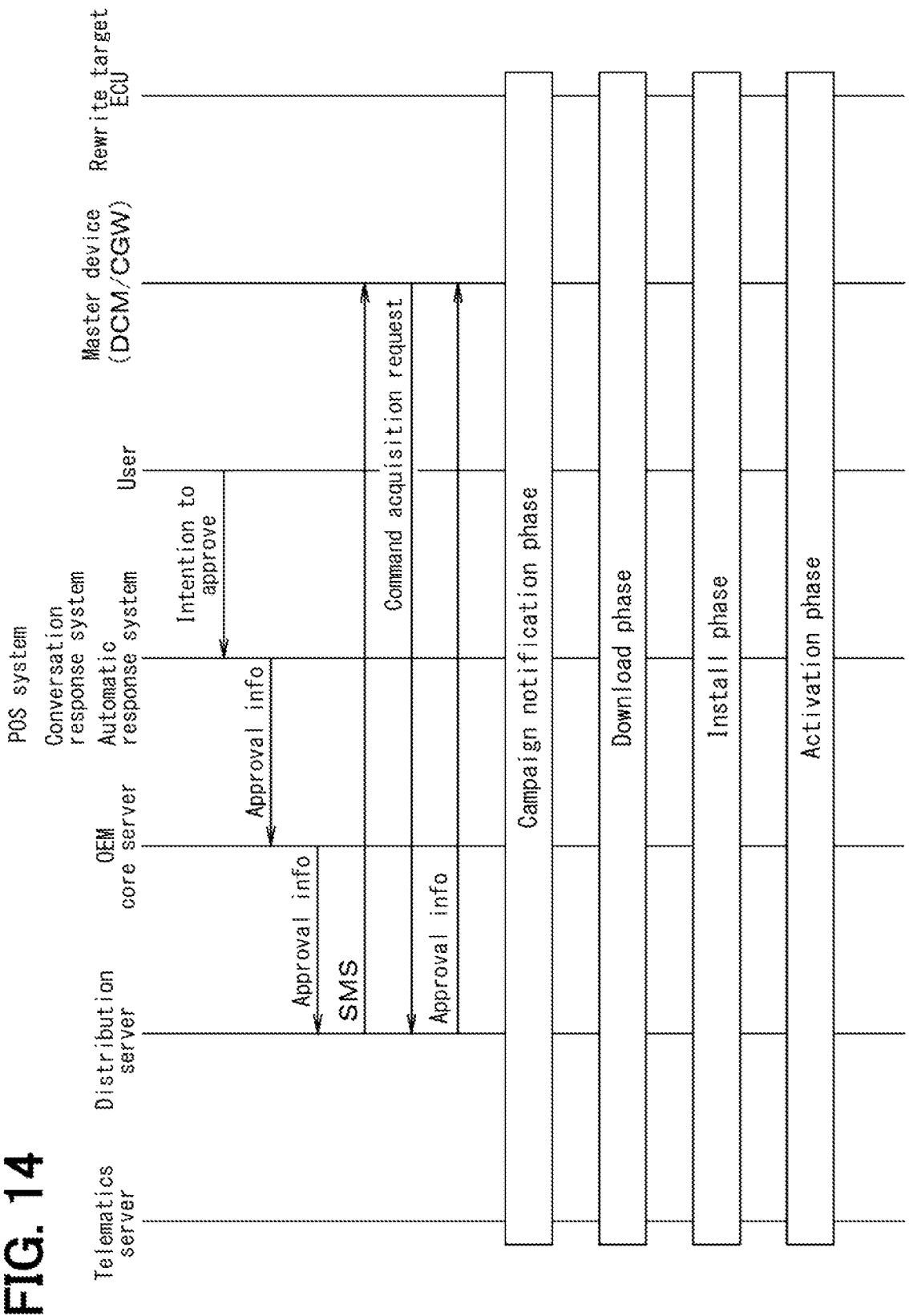
FIG. 14 is a sequence diagram (No. 1)

As illustrated in FIG. 14, when the user selects the collective approval, the CGW 13 continuously performs the campaign notification phase, the download phase, the installation phase and the activation phase, so that all of the phases are performed at once for the rewriting of the application program and the batch rewriting not requiring a phase-by-phase basis approval is performed. As illustrated in FIG. 15 and FIG. 16, when the user selects the separate approval, the CGW 13, after the campaign notification phase, performs the download phase, the installation phase, and the activation phase while determining separately-given approval for each phase, so that rewriting of the application program is performed separately on a phase-by-phase basis and the separate rewriting requiring the phase-by-phase basis approval is performed. Only for part of the phases, the CGW 13 may determine the separately-given approval. For example, the CGW 13 may determine the separately-given approval for the activation phase only, without determining the separately-given approval for the download phase nor the separately-given approval for the installation phase. In the course of the rewriting of the application program, switching between the batch rewriting and the separate rewriting may be performed.

The present embodiment as described above provides the following effects.

The vehicle program rewriting system 1 is provided with the POS system 25, the conversation response system 26, and the automatic response system 27, as means for the user to give approval for program update, and performs the rewriting of the program when the user gives the approval for the program update by using the POS system 25, the conversation response system 26, or the automatic response system 27. Even a user who does not have his/her own mobile terminal 6 and a user of a vehicle not equipped with the in-vehicle display 7 can give approval for program update by using the POS system 25, the conversation response system 26, or the automatic response system 27, so that it is possible to rewrite the program appropriately.

Specifically, when: the user causes a scanner to read the QR code printed on the postcard 28; the user inputs the telephone number printed on the postcard 28; or the user operates the "connect to operator" buttons 29*b*, 30*b* or the "automatic response" buttons 29*c*, 30*c*, the rewriting of the application program is performed. Even a user who does not have his/her own mobile terminal 6 and a user of a vehicle not equipped with the in-vehicle display 7 can give approval for program update. Further, it is not necessary to urge a user who does not have his/her own mobile terminal 6 to possess a mobile terminal 6 and it is not necessary to urge a user of a vehicle not equipped with the in-vehicle display to mount an in-vehicle display 7. Moreover, it is not necessary to urge a user not accustomed to operating an information device to become accustomed to the operation.

When the guidance screen 29 for the campaign notification is displayed on the mobile terminal 6, the "normal procedure" button 29a is displayed as an invitation for program update using the mobile terminal 6 and the "connect to operator" button 29b is displayed as an invitation for program update using the conversation response system 26 and the "automatic response" button 29c is displayed as an invitation for program update using the automatic response system 27. A user having his/her own mobile device 6 can select whether to give the approval by using the mobile terminal 6 or give the approval by using the conversation response system 26 or the automatic response system 27, which enhances operability.

The same applies to the in-vehicle display 7. When the guidance screen 30 for the campaign notification is displayed on the in-vehicle display 7, the "normal procedure" button 30a is displayed as an invitation for program update using the in-vehicle display 7 and the "connect to operator" button 30b is displayed as an invitation for program update using the conversation response system 26 and the "automatic response" button 30c is displayed as an invitation for program update using the automatic response system 27. A user of the vehicle having the in-vehicle display 7 can select whether to give the approval by using the in-vehicle 7 or give the approval by using the conversation response system 26 or the automatic response system 27, which enhances operability.

In addition, when the user selects the collective approval, the batch rewriting not requiring approval for each phase is performed, and when the user selects the separate approval, the separate rewriting requiring approval for each phase is performed. In addition, it is possible to switch between the batch rewriting and the separate rewriting in the course of the rewriting of the application program. The user can freely select the batch rewriting or the separate rewriting, and it is possible to increase the degree of freedom in the rewriting of the application program.

When the user sets the start timing of the installation phase, the installation phase starts in accordance with the start timing. It is possible to freely set the start timing of installation to the rewrite target ECU 19, and it is possible increase the degree of freedom in the rewriting of the application program.

By using the POS system 25, the conversation response system 26, and the automatic response system 27, the implementation is facilitated by modifying the existing POS system 25, the existing conversation response system 26 and the existing automatic response system 27 without newly constructing a system dedicated to program update approval. Moreover, in the conversation response system 26, because the user talks with the operator, it is possible to give the user peace of mind.

Although the present disclosure has been described in accordance with examples, it is to be understood that the present disclosure is not limited to the examples and structures. The present disclosure encompasses various modifications and variations within the scope of equivalents. Furthermore, various combinations and configurations, and other combinations and configurations including only one, more than one, or less may be included in the scope and the spirit of the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. An electronic control system for a vehicle, comprising at least one processor that is configured to:
   receive approval information of a user in response to the user giving an approval for a program update for the vehicle using an in-vehicle display or the user giving an approval for the program update for the vehicle using a mobile terminal; and
   perform a program rewrite for the vehicle in response to receiving the approval information, wherein
   the program update includes a campaign notification phase, a download phase, an installation phase, and an activation phase,
   the approval by the user includes a separate approval for each phase of the program update and a collective approval for the entire program update, and
   the at least one processor is further configured to:
      perform a separate program rewrite that requires an approval for each phase of the program update upon receiving the separate approval; and
      perform a collective program rewrite that does not require the approval for each phase of the program update upon receiving the collective approval.

2. The electronic control system according to claim 1, wherein
   the at least one processor is disposed in an in-vehicle device that has a data relay function to distribute, to a rewrite target electronic control unit, the update data downloaded through a communication device.

3. The electronic control system according to claim 1, wherein:
   the at least one processor is disposed in an in-vehicle device that has a data relay function to distribute, to a rewrite target electronic control unit, the update data downloaded through a communication device.

4. The electronic control system according to claim 1, wherein
   the campaign notification phase, the download phase, the installation phase, and the activation phase are performed during the program update in this order.

5. The electronic control system according to claim 4, wherein
   the separate approval is required for each phase before the at least one processor proceeds to the next phase in the indicated order.

6. The electronic control system according to claim 1, wherein
   the collective approval is an approval entirely approving the program update from the campaign notification phase to the activation phase.

7. The electronic control system according to claim 1, wherein the collective approval is an approval collectively approving the program update from the campaign notification phase to the installation phase.

8. An electronic control system for a vehicle, comprising:
a center device; and
a vehicle system that includes:
an in-vehicle display;
a rewrite target electronic control unit that is a target for a program rewrite using update data; and
at least one processor that is configured to:
download, from the center device, the update data for a program update for the vehicle; and
perform the program rewrite for the rewrite target electronic control unit in response to a user giving an approval for the program update using the in-vehicle display or the user giving an approval for the program update using a mobile terminal, wherein:
the program update includes a campaign notification phase, a download phase, an installation phase, and an activation phase,
the approval by the user includes a separate approval for each phase of the program update and a collective approval for the entire program update, and
the at least one processor is configured to:
perform a separate program rewrite that requires an approval for each phase of the program update when the user gives the separate approval; and
perform a collective program rewrite that does not require an approval for each phase of the program update when the user gives the collective approval.

9. A vehicle system, comprising:
an in-vehicle display;
a rewrite target electronic control unit that is a target for a program rewrite using update data; and
at least one processor that is configured to:
download the update data for a program update for a vehicle; and
perform a program rewrite for the rewrite target electronic control unit in response to a user giving an approval for the program update using the in-vehicle display or the user giving an approval for the program update using a mobile terminal, wherein:
the program update includes a campaign notification phase, a download phase, an installation phase, and an activation phase,
the approval by the user includes a separate approval for each phase of the program update and a collective approval for the entire program update, and
the at least one processor is configured to:
perform a separate program rewrite that requires an approval for each phase of the program update when the user gives the separate approval; and
perform a collective program rewrite that does not require an approval for each phase of the program update when the user gives the collective approval.

10. A mobile terminal configured to receive an input from a user, the mobile terminal comprising:
at least one processor that is configured to display, on a display, a campaign notification indicating a program for a vehicle is rewritable and an approval screen through which the user makes an approval for a program update for the vehicle, wherein
the approval by the user includes a separate approval for each phase of the program update and a collective approval for the entire program update, and
a vehicle system of the vehicle is configured to:
perform a separate program rewrite that requires an approval for each phase of the program update when the user gives the separate approval; and
perform a collective program rewrite that does not require an approval for each phase of the program update when the user gives the collective approval, and
the at least one processor is configured to:
sequentially display, on the display, the approval screen for the approval by the user for each phase of the program update according to a progress of the program update during the separate program rewrite; and
not sequentially display, on the display, the approval screen for the approval by the user for each phase of the program update according to a progress of the program update during the collective program rewrite.

11. An electronic control system for a vehicle, comprising
at least one processor that is configured to:
receive approval information of a user in response to the user giving an approval for a program update for the vehicle using an in-vehicle display or the user giving an approval for the program update for the vehicle using a mobile terminal; and
perform a program rewrite for the vehicle in response to receiving the approval information, wherein
the program update includes a campaign notification phase, a download phase, an installation phase, and an activation phase,
the approval by the user includes a separate approval for one of the phases of the program update and a collective approval for two or more of the phases of the program update, and
the at least one processor is further configured to:
perform, upon receiving the separate approval, the program update by executing the one of the phases that is approved by the separate approval; and
perform, upon receiving the collective approval, the program update by executing the two or more of the phases that are approved by the collective approval in a manner where an approval for each of the two or more of the phases is not required in accordance with progress of the program update.

12. The electronic control system according to claim 11, wherein
the campaign notification phase, the download phase, the installation phase, and the activation phase are performed during the program update in this order.

13. The electronic control system according to claim 12, wherein
the separate approval is required for each phase before the at least one processor proceeds to the next phase in the indicated order.

14. The electronic control system according to claim 11, wherein
the collective approval is an approval entirely approving the program update from the campaign notification phase to the activation phase.

15. The electronic control system according to claim 11, wherein
the collective approval is an approval collectively approving the program update from the campaign notification phase to the installation phase.

16. The electronic control system according to claim 11, wherein the separate approval is one of an approval approving the program update only for the campaign notification phase, an approval approving the program update only for the download phase, an approval approving the program update only for the installation phase, and an approval approving the program update only for the activation phase.

17. The electronic control system according to claim 11, wherein
the approval includes the collective approval collectively approving the program update from the campaign notification phase to the installation phase and the separate approval approving the program update only for the activation phase.

18. An electronic control system for a vehicle, comprising:
a center device; and
a vehicle system that includes:
an in-vehicle display;
a rewrite target electronic control unit that is a target for a program rewrite using update data; and
at least one processor that is configured to:
download, from the center device, the update data for a program update for the vehicle; and
perform the program rewrite for the rewrite target electronic control unit in response to a user giving an approval for the program update using the in-vehicle display or the user giving an approval for the program update using a mobile terminal, wherein
the program update includes a campaign notification phase, a download phase, an installation phase, and an activation phase,
the approval by the user includes a separate approval for one of the phases of the program update and a collective approval for two or more of the phases of the program update, and
the at least one processor is configured to:
perform, upon receiving the separate approval, the program update by executing the one of the phases that is approved by the separate approval; and
perform, upon receiving the collective approval, the program update by executing the two or more of the phases that are approved by the collective approval in a manner where an approval for each of the two or more of the phases is not required in accordance with progress of the program update.

19. The electronic control system according to claim 18, wherein
the campaign notification phase, the download phase, the installation phase, and the activation phase are performed during the program update in this order.

20. The electronic control system according to claim 19, wherein
the separate approval is required for each phase before the at least one processor proceeds to the next phase in the indicated order.

21. A vehicle system, comprising:
an in-vehicle display;
a rewrite target electronic control unit that is a target for a program rewrite using update data; and
at least one processor that is configured to:
download the update data for a program update for a vehicle; and
perform a program rewrite for the rewrite target electronic control unit in response to a user giving an approval for the program update using the in-vehicle display or the user giving an approval for the program update using a mobile terminal, wherein
the program update includes a campaign notification phase, a download phase, an installation phase, and an activation phase,
the approval by the user includes a separate approval for one of the phases of the program update and a collective approval for two or more of the phases of the program update, and
the at least one processor is configured to:
perform, upon receiving the separate approval, the program update by executing the one of the phases that is approved by the separate approval; and
perform, upon receiving the collective approval, the program update by executing the two or more of the phases that are approved by the collective approval in a manner where an approval for each of the two or more of the phases is not required in accordance with progress of the program update.

22. The vehicle system according to claim 21, wherein
the campaign notification phase, the download phase, the installation phase, and the activation phase are performed during the program update in this order.

23. The electronic control system according to claim 22, wherein
the separate approval is required for each phase before the at least one processor proceeds to the next phase in the indicated order.

* * * * *